United States Patent
Cox et al.

(10) Patent No.: US 7,187,863 B2
(45) Date of Patent: Mar. 6, 2007

(54) IDENTIFYING SUBSTREAMS IN PARALLEL/SERIAL DATA LINK

(75) Inventors: Susan Marie Cox, Rochester, MN (US); Mark Joseph Hickey, Rochester, MN (US); Jack Chris Randolph, Rochester, MN (US); Dale John Thomforde, Pine Island, MN (US); Frederick Jacob Ziegler, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 694 days.

(21) Appl. No.: 10/021,961

(22) Filed: Dec. 13, 2001

(65) Prior Publication Data

US 2003/0112881 A1 Jun. 19, 2003

(51) Int. Cl.
*H04J 14/00* (2006.01)
(52) U.S. Cl. ............................. 398/43; 370/536; 385/24
(58) Field of Classification Search .................. 398/43; 370/536, 366; 385/24; 341/100; 375/260
See application file for complete search history.

(56) References Cited

U.S. PATENT DOCUMENTS

| 4,383,316 | A | * | 5/1983 | Seidel .......................... 370/536 |
| 4,994,909 | A | * | 2/1991 | Graves et al. ................. 725/92 |
| H1175 | H | * | 4/1993 | Giorgio ........................ 370/536 |
| 5,408,473 | A | * | 4/1995 | Hutchison et al. ........... 370/506 |
| 5,455,831 | A | | 10/1995 | Bartow et al. |
| 5,539,846 | A | * | 7/1996 | Morikura et al. .............. 385/24 |
| 5,648,776 | A | * | 7/1997 | Widmer ....................... 341/100 |
| 5,771,229 | A | * | 6/1998 | Gavrilovich ................. 370/342 |
| 5,859,904 | A | * | 1/1999 | Huang ......................... 379/219 |
| 6,031,847 | A | | 2/2000 | Collins et al. |
| 6,058,433 | A | * | 5/2000 | Gilbert ........................ 709/250 |
| 6,775,305 | B1 | * | 8/2004 | Delvaux ...................... 370/535 |
| 6,980,600 | B1 | * | 12/2005 | Ratnarajah ................... 375/260 |
| 2003/0086503 | A1 | * | 5/2003 | Rennert et al. .............. 375/260 |

OTHER PUBLICATIONS

U.S. Appl. No. 10/022,139, filed Dec. 13, 2001, entitled "Method and Apparatus for Deskewing Parallel Serial Data Channels Using Asynchronous Elastic Buffers".

* cited by examiner

*Primary Examiner*—David C. Payne
(74) *Attorney, Agent, or Firm*—Dugan & Dugan (57) ABSTRACT

In a first aspect, a stream of data is transmitted by dividing the stream of data into a first substream and a second substream, transmitting the first substream in a first data channel, and transmitting the second substream in a second data channel. Before transmitting the first and second substreams, a first marker signal is inserted in the first substream and/or a second marker signal is inserted in the second substream. A receiver circuit receives the substreams, detects at least one marker signal, and reassembles the data stream from the substreams based on at least one detected marker signal. Numerous other aspects are provided.

24 Claims, 7 Drawing Sheets

IDENTIFYING SUBSTREAMS IN PARALLEL/SERIAL DATA LINK

FIELD OF THE INVENTION

This invention is related to data communication, and is more particularly concerned with a data link composed of parallel serial connections.

BACKGROUND OF THE INVENTION

The assignee of the present invention has proposed a parallel/serial data link in which a transmitter having two ports is connected via two optical fibers to a receiver having two ports. For convenience, the two transmitter ports will be referred to as transmitter ports A and B and the two receiver ports will be referred to as receiver ports A and B. The optical fiber connected to transmitter port A will be referred to as fiber A and the optical fiber connected to transmitter port B will be referred to as fiber B.

Unless special precautions are taken, fiber A may be connected to either one of receiver ports A and B. Similarly, fiber B may be connected to either one of receiver ports A and B. In such a case, if receiver port B is connected to transmitter port A (or if receiver port A is connected to transmitter port B), the receiver will fail to properly process data received from the transmitter.

According to known techniques, keying systems may be employed to assure that transmitter port A is connected via fiber A to receiver port A and transmitter port B is connected via fiber B to receiver port B. However, such keying systems increase the cost of the optical fibers and the transmitter and receiver ports by requiring special parts and processing. Optical fibers also may be labeled or physically marked to facilitate proper connection. However, even with labeling, the optical fibers may be connected improperly. In such instances, a user typically will be unaware of this misconnection, resulting in confusion and/or system downtime. Accordingly, other techniques for assuring the proper connection of transmitter port A and receiver port A, and transmitter port B and receiver port B, would be desirable.

SUMMARY OF THE INVENTION

According to an aspect of the invention, a method of transmitting a stream of data is provided. The method includes dividing the stream of data into a first substream and a second substream, transmitting the first substream in a first data channel, transmitting the second substream in a second data channel, and prior to transmitting the first substream in the first data channel, inserting a first marker signal in the first substream. More than two substreams may be employed.

The method may further include receiving the first substream and detecting the first marker signal therein to identify the first substream. The method may further include, prior to transmitting the second substream in the second data channel, inserting a second marker signal in the second substream. Further, the method may include receiving the second substream and detecting the second marker signal therein to identify the second substream.

The term "marker signal" as used herein and in the appended claims includes any signal used to distinguish one substream from any other substream. The term "substream" as used herein and in the appended claims includes any stream of data derived as a subset of a data stream.

According to another aspect of the invention, a method of transmitting a stream of data includes dividing the stream of data into a plurality of substreams, transmitting the substreams in respective data channels, and, prior to the transmitting step, inserting a respective marker signal in at least one of the substreams.

According to still another aspect of the invention, a data communication apparatus includes a transmitter, a receiver, a first data channel connecting the receiver to the transmitter, and a second data channel connecting the receiver to the transmitter. The transmitter operates to divide a stream of data into a first substream and a second substream, insert a first marker signal in the first substream, transmit the first substream to the receiver via the first data channel, and transmit the second substream to the receiver via the second data channel.

According to still another aspect of the invention, a data communication apparatus includes a transmitter, a receiver, and a plurality of data channels connecting the receiver to the transmitter. The transmitter operates to divide a stream of data into a plurality of substreams, insert a respective marker signal in at least n minus one of the substreams (where n is the total number of substreams), and transmit each of the substreams in a respective one of the data channels. The receiver may operate to receive the transmitted substreams and to detect a marker signal in at least n minus one of the received substreams to identify at least n minus one of the received substreams.

When the method and apparatus of the present invention are employed within the previously described parallel/serial data link, it does not matter which port of the receiver each optical fiber is connected to. The receiver is able to detect marker signals in the received substreams, identify the substreams on the basis of the detected marker signals, and configure itself to properly process the received substreams. No special keying system or other arrangement need be provided to assure that a particular optical fiber is connected to a particular port.

Other objects, features and advantages of the present invention will become more fully apparent from the following detailed descriptions of exemplary embodiments, the appended claims and the accompanying drawings.

DETAILED DESCRIPTION

Figure 1:
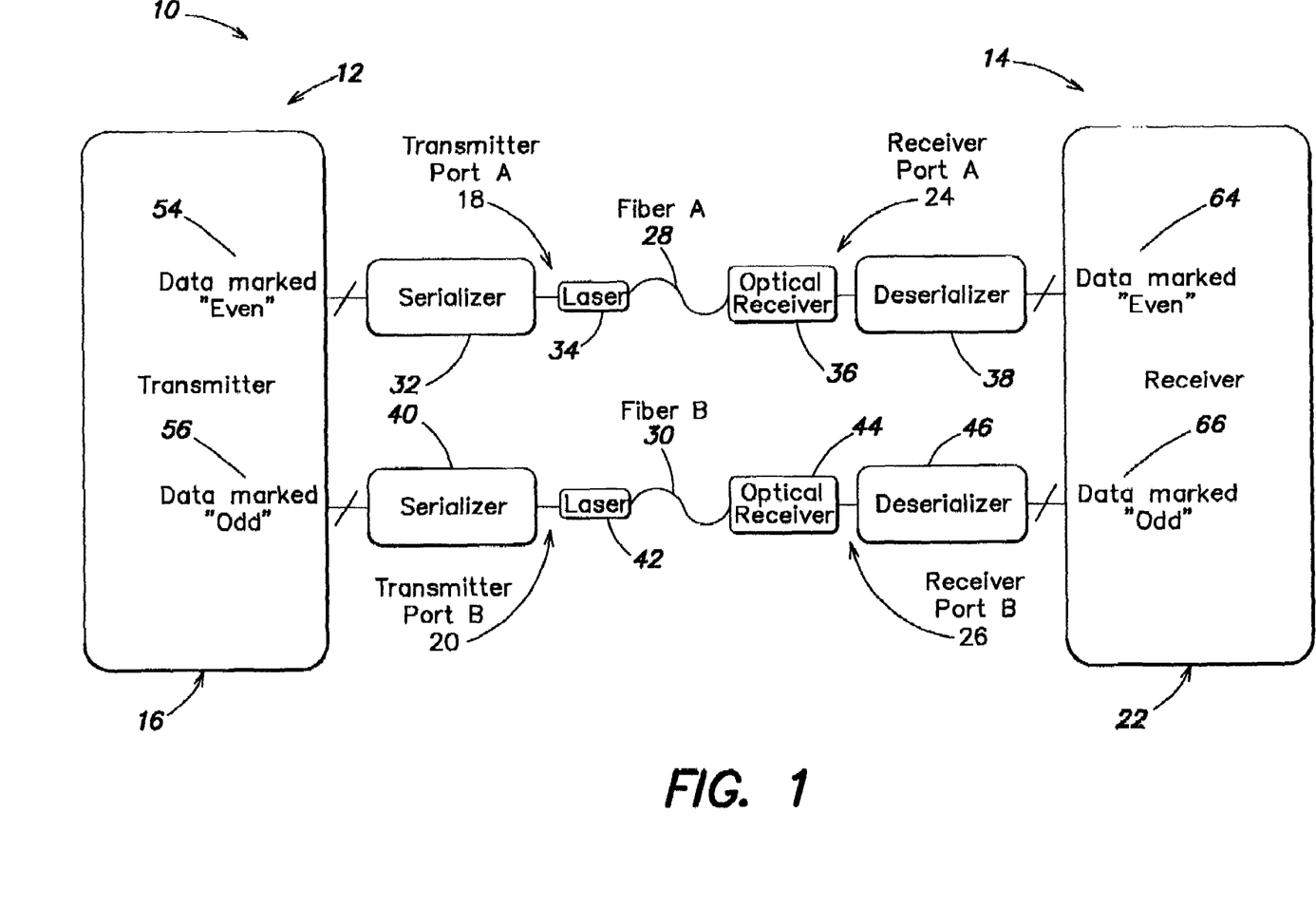
FIG. 1 is a block diagram of a data communication apparatus provided in accordance with the invention, in a first configuration.

FIG. 1 is a block diagram of a data communication apparatus provided according to the invention, in a first configuration. Reference numeral 10 generally indicates the data communication apparatus. The inventive data communication apparatus 10 includes a transmitter side 12 and a receiver side 14. The transmitter side 12 of the data communication apparatus 10 includes a transmitter circuit 16, a transmitter port 18 (transmitter port A) and a transmitter port 20 (transmitter port B). The receiver side 14 of the data communication apparatus 10 includes a receiver circuit 22, a receiver port 24 (receiver port A), and a receiver port 26 (receiver port B). A first optical fiber 28 (fiber A) is connected to the transmitter port A (reference numeral 18) and to the receiver port A (reference numeral 24). A second optical fiber 30 (fiber B) is connected to the transmitter port B (reference numeral 20) and to the receiver port B (reference numeral 26).

The transmitter port A (reference numeral 18) includes a first serializer circuit 32 and a first laser 34. The receiver port A (reference numeral 24) includes a first optical receiver 36 and a first deserializer circuit 38. The first serializer circuit 32 receives bit-parallel data bytes from the transmitter circuit 16 and converts the bit-parallel data bytes into a serial signal. The first laser 34 is coupled to the first serializer circuit 32 and transmits the serial signal output from the first serializer circuit 32 along the optical fiber 28 (fiber A) in the form of an optical signal. The first optical receiver 36 receives the optical signal transmitted through the optical fiber 28 (fiber A) and converts the optical signal into a serial electrical signal. The first deserializer circuit 38 is coupled to the first optical receiver 36 and converts the serial electrical signal output from the optical receiver 36 into bit-parallel data bytes. The first deserializer circuit 38 is coupled to the receiver circuit 22 and provides to the receiver circuit 22 the bit-parallel data bytes output from the first deserializer circuit 38.

The transmitter port B (reference numeral 20) includes a second serializer circuit 40 and a second laser 42. The receiver port B (reference numeral 26) includes a second optical receiver 44 and a second deserializer circuit 46. The second serializer circuit 40 is coupled to the transmitter circuit 16 and receives bit-parallel data bytes therefrom. The second serializer circuit 40 converts the bit-parallel data bytes from the transmitter circuit 16 into a serial signal. The second laser 42 is coupled to the second serializer circuit 40, and transmits the serial signal output from the second serializer circuit 40 along the optical fiber 30 (fiber B) in the form of an optical signal. The second optical receiver 44 receives the optical signal transmitted along the optical fiber 30 (fiber B) and converts that optical signal into a serial electrical signal. The second deserializer circuit 46 is coupled to the second optical receiver 44 and converts the serial electrical signal output from the second optical receiver 44 into bit-parallel data bytes. The bit-parallel data bytes are received by the receiver circuit 22 from the second deserializer circuit 46.

The first serializer 32, the second serializer 40, the first laser 34, the second laser 42, the optical fibers 28 and 30, the first optical receiver 36, the second optical receiver 44, the first deserializer circuit 38, and the second deserializer circuit 46 may all be conventional components and/or may operate in accordance with conventional principles. For example, the first serializer circuit 32, the second serializer circuit 40, the first deserializer circuit 38 and the second deserializer circuit 46 may each be constituted by a respective part of a conventional serializer/deserializer ("serdes") such as Agilent model number HDMP2631. Moreover, each of the transmitter circuit 16 and the receiver circuit 22 may be constituted as part of a respective transceiver circuit. In one embodiment of the invention, such transceiver circuits may be implemented using a PLD (programmable logic device) such as the Xilinx model XCV300E-8FG456C. The lasers 34, 42 may comprise, for example, conventional laser diodes and associated control logic (not shown). For example, the lasers 34, 42 and the optical receivers 36, 44 may comprise small form factors (SFF) which include the requisite optical devices and associated control, amplification and/or modulation logic (not shown) for proper operation as is known in the art. It will be understood that the data communication apparatus 10 shown in FIGS. 1 and 2 constitutes a one-way data communication link, but may be part of a two-way data connection.

Figure 2:
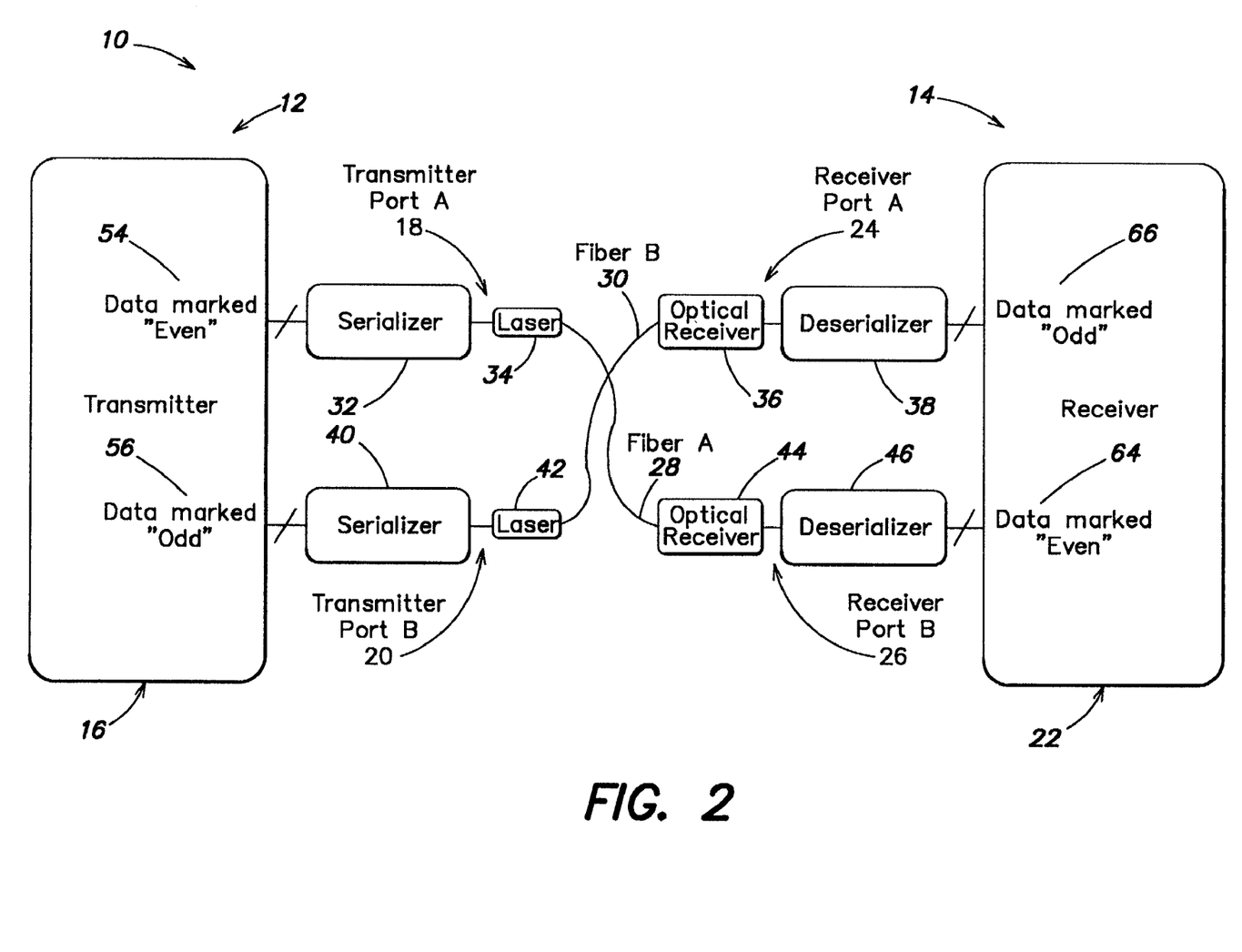
FIG. 2 is a block diagram of the data communication apparatus of FIG. 1 in a second configuration.

FIG. 2 illustrates another configuration in which the data communication apparatus 10 may be operated. In this other configuration, the optical fiber 28 (fiber A) is coupled to the receiver port B (reference numeral 26) instead of being coupled to the receiver port A (reference numeral 24). Also, the optical fiber 30 (fiber B) is coupled to the receiver port A (reference numeral 24) instead of being coupled to the receiver port B (reference numeral 26).

Figure 3:
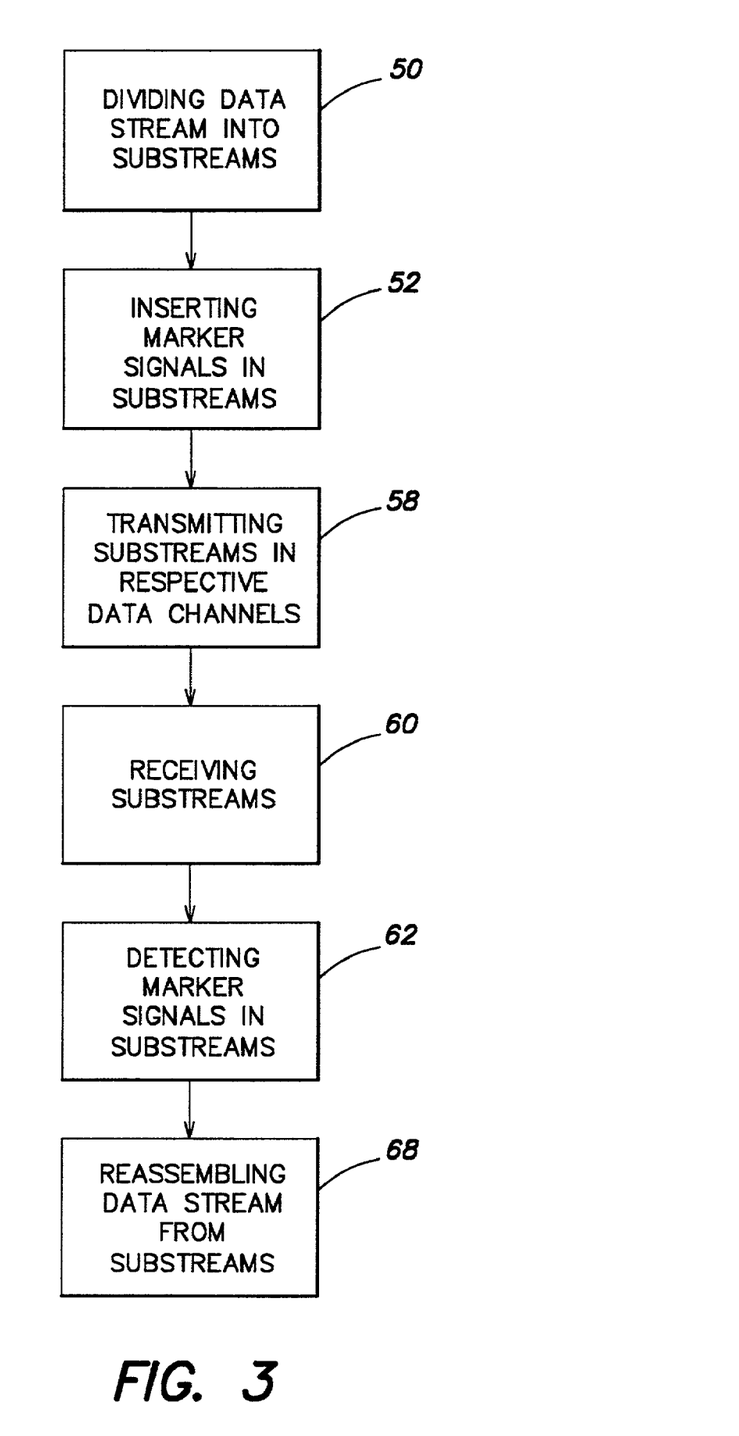
FIG. 3 is a flow chart that illustrates an exemplary method performed in accordance with the invention.

FIG. 3 is a flow chart that provides an overview of exemplary functions that may be performed by the transmitter circuit 16 and the receiver circuit 22. Initially in the flow chart of FIG. 3 is a block 50. Block 50 represents the function of dividing a data stream into substreams. This function is performed in the transmitter circuit 16. That is, a stream of data to be transmitted by the transmitter circuit 16 is divided into substreams to be transmitted, respectively, by the data channels constituted by the optical fibers 28 and 30. Exemplary techniques for generating substreams from a data stream are described below with reference to FIGS. 4–5B. It will be understood that any suitable technique for generating substreams may be employed.

Following block 50 is block 52. Block 52 represents the function of inserting marker signals in the substreams. This function is also performed by the transmitter circuit 16. As indicated at 54 in FIGS. 1 and 2, the substream to be transmitted via the transmitter port A (reference numeral 18) and the first optical fiber 28 (fiber A) may be marked "even", for example. On the other hand, the substream to be transmitted via the transmitter port B (reference numeral 20) and the second optical fiber 30 (fiber B) may be marked "odd" as indicated at 56 in FIGS. 1 and 2. Other designations/markers may be employed.

Further details of the dividing of a data stream into substreams and the inserting of marker signals into the substreams will be provided below with reference to FIGS. 4–5B.

Following block 52 is block 58. At block 58 the marked substreams are respectively transmitted in the data channels represented by the optical fibers 28 and 30. This function is performed by the transmitter circuit 16 in conjunction with the transmitter port A (reference numeral 18) and the transmitter port B (reference numeral 20).

Following block 58 is block 60. Block 60 represents the function of receiving the substreams transmitted through the optical fibers 28 and 30. This function is performed by the receiver circuit 22 in conjunction with the receiver port A (reference numeral 24) and the receiver port B (reference numeral 26).

Following block 60 is block 62. Block 62 represents the function of detecting the marker signals that were inserted in the substreams by the transmitter circuit 16 (in block 52). This detecting function is performed by the receiver circuit 22. Thus, in the configuration of FIG. 1, the substream that has been marked "even" by the transmitter circuit 16 is received by the receiver circuit 22 via the receiver port A (reference numeral 24), as indicated at 64 in FIG. 1. The marker signal or signals indicating that the substream has been marked "even" is/are detected by the receiver circuit 22. At the same time, the substream that has been marked "odd" is received by the receiver circuit 22 via the receiver port B (reference numeral 26) in the configuration of FIG. 1 as indicated at 66 in FIG. 1. The marker signal/signals in that data stream is/are also detected by the receiver circuit 22.

Turning to FIG. 2, in the configuration represented in that drawing, the substream that has been marked "odd" by the transmitter circuit 16 is received by the receiver circuit 22 via the receiver port A (reference numeral 24), and the substream that was marked "even" by the transmitter circuit 16 is received by the receiver circuit 22 via the receiver port B (reference numeral 26). By detecting the respective marker signals in the substreams, the receiver circuit 22 is able, in both configurations, to determine which substream is received via which receiver port.

Following block 62 in FIG. 3 is block 68. Block 68 represents the function of reassembling the original data stream from the substreams received at the receiver circuit 22. This function is performed by the receiver circuit 22. Because the respective substreams are marked, and the markings are detected by the receiver circuit 22, the receiver circuit 22 is able to properly reassemble the data stream in both of the configurations shown in FIG. 1 and FIG. 2, i.e., regardless of which of the optical fibers 28 and 30 is plugged into which of the receiver ports 24 and 26.

Details of the processes represented by blocks 62 and 68 will be provided below with reference to FIGS. 6–7B.

Figure 4:
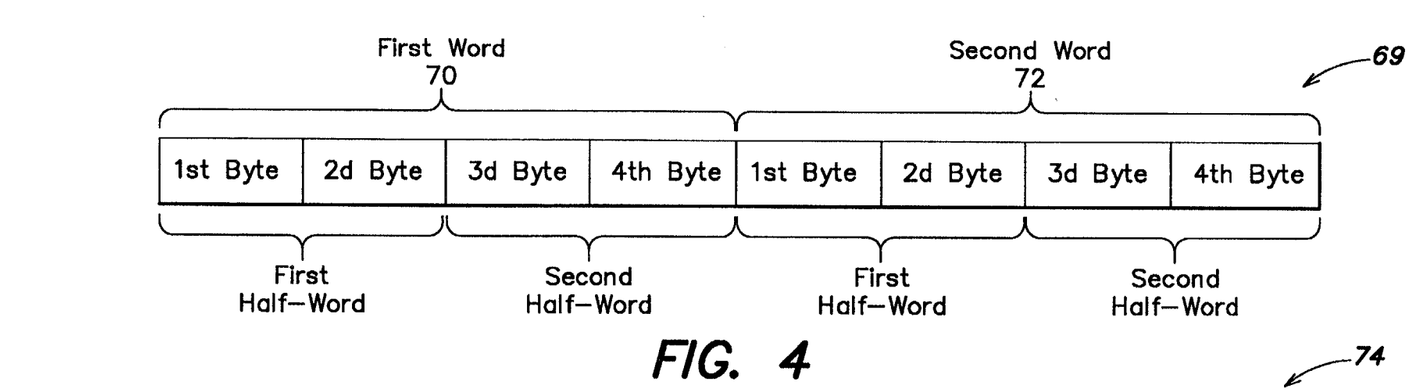
FIG. 4 illustrates an exemplary format of a data stream transmitted in accordance with the invention.

FIG. 4 is a schematic illustration of an exemplary data stream that is to be divided into substreams by the transmitter circuit 16. Reference numeral 69 generally indicates the data stream. In particular, FIG. 4 shows two adjacent words of the data stream 69, including a first word 70 and a second word 72. Although not shown in FIG. 4, it will be appreciated that the data stream 69 may include other components besides data words, such as synchronization signals and beginning and ending characters for data frames.

As illustrated in FIG. 4, each of the data words 70, 72 is composed of four bytes. In one embodiment, each byte may be ten bits, having been encoded according to the well-known eight bit/ten bit (8 b/10 b) encoding scheme of the Fibre Channel data communications standard (e.g., ANSI X3.230-1994-FC-PH Fibre Channel Standards). Other coding schemes may be employed if desired.

Each of the data words 70, 72 may also be considered to include a first half-word, consisting of the respective first and second bytes of the data word, and a second half-word consisting of the third and fourth bytes of the data word. In one embodiment of the invention, the data stream 69 schematically illustrated in FIG. 4 is divided into substreams by placing all of the first half-words of the respective data words in a first substream, and by placing all of the second half-words of the respective data words in a second substream. Any other method of dividing the data stream 69 into substreams may be employed.

Figure 5A:
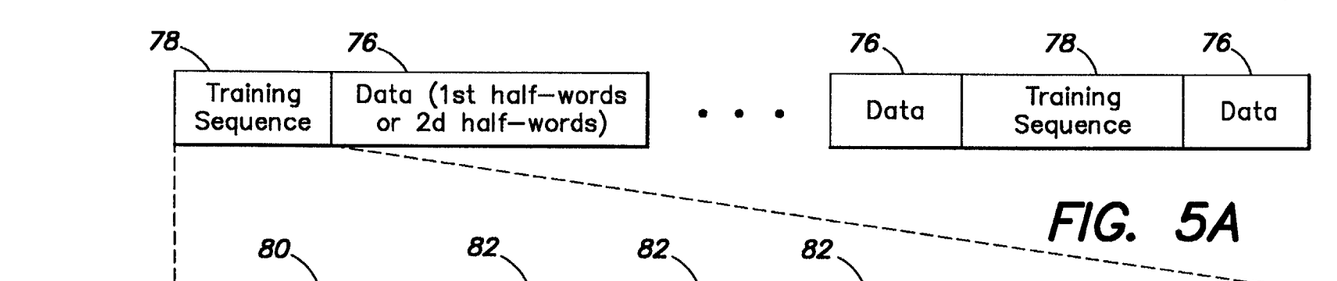
FIGS. 5A and 5B together illustrate an exemplary format of a substream of data derived from the data stream of FIG. 4.

FIG. 5A schematically illustrates a substream that may be formed by the transmitter circuit 16 by dividing the data stream 69 of FIG. 4. Reference numeral 74 generally indicates the substream illustrated in FIG. 5A.

The substream 74 is made up of two components, namely data 76 (which may be either first half-words of the data stream 69 of FIG. 4 or second half-words of the data stream 69 of FIG. 4) and training sequences 78. The training sequences 78 are interspersed among the data 76 at regular or irregular intervals of, for example, 8 to 32 microseconds. Other intervals may be used, and such intervals may be based at least in part on the frequency of the data stream being divided.

Figure 5B:
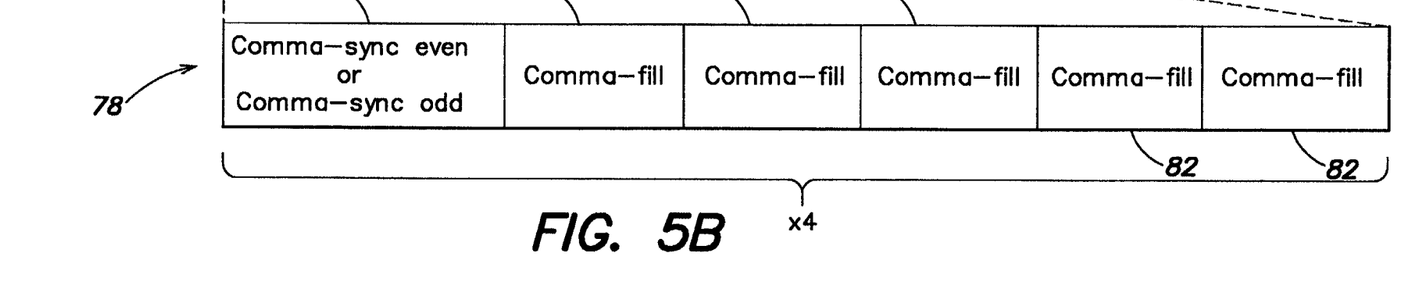

FIG. 5B illustrates details of an exemplary training sequence 78. In one embodiment, the training sequence 78 includes a sequence of six 2-byte characters repeated four times, where the six character sequence has a "comma-sync even" or "comma-sync odd" character 80 and at least five "comma-fill" characters 82. The "comma-sync even" or "comma-sync odd" character 80 is employed as the above-mentioned marker signal to identify either the substream having first half-words or the substream having second half-words, as the case may be. In one embodiment, the substream having first half-words is transmitted via the transmitter port A (reference numeral 18) and includes, in its respective training sequences, the "comma-sync even" character as a marker signal; and the substream having second half-words is transmitted via the transmitter port B and includes, in its training sequences, the "comma-sync odd" character as a marker signal. Of course, permutations of this arrangement are contemplated. For example, the "comma-sync odd" character may be included in the training sequences of the substream having first half-words, and the "comma-sync even" character may be included in the training sequences of the substream having the second half-words. Moreover, the substream having the first half-words may be transmitted via the transmitter port B, and the substream having the second half-words may be transmitted via the transmitter port A.

In one embodiment of the invention, the training sequence 78 includes at least five "comma-fill" characters 82 following the "comma-sync even" or "comma-sync odd" character. However, a larger or smaller minimum number of "comma-fill" characters 82 may be included in the training sequence 78.

In one embodiment of the invention, the "comma-sync even" character is represented by the bit pattern "001111__1010" (left byte) followed by "001001__1001" (right byte); and the "comma-sync odd" character is represented by the bit pattern "001111__1010" (left byte) followed by "001001__0101" (right byte). Other bit patterns may be used.

Figure 6:
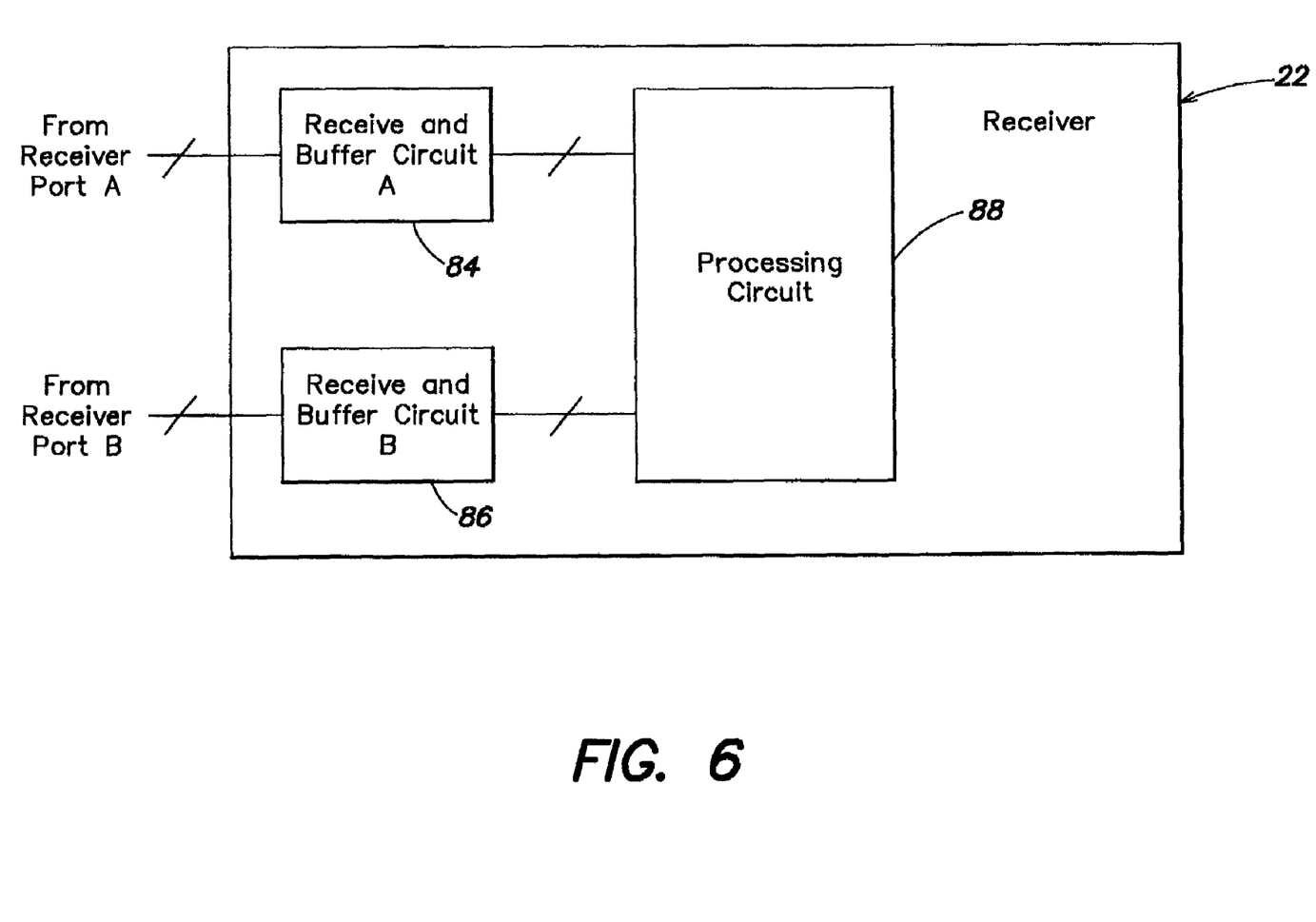
FIG. 6 shows details of an exemplary receiver circuit that is part of the data communication apparatus of FIGS. 1 and 2.

FIG. 6 shows details of an exemplary embodiment of the receiver circuit 22. As seen from FIG. 6, the receiver circuit 22 includes a receive and buffer circuit A (reference numeral 84) which receives and stores bit-parallel data bytes received via the receiver port A (FIG. 1), and receive and buffer circuit B (reference numeral 86) which receives and stores bit-parallel data bytes received via the receiver port B (FIG. 1). Coupled to both the receive and buffer circuit A (reference numeral 84) and the receive and buffer circuit B (reference numeral 86) is a processing circuit 88 (e.g., an appropriately programmed programmable logic device or other suitable logic circuitry, a programmed processor, etc.). The processing circuit 88 may perform deskewing of two substreams received by the receiver circuit 22 as described in co-pending patent application Ser. No. 10/022,139, filed Dec. 13, 2001 (Attorney Docket No. ROC920010226US1). This co-pending patent application is incorporated herein by reference in its entirety. In addition, the processing circuit 88 may perform the functions of detecting marker signals in substreams and reassembling the data stream from the substreams, as referred to in connection with blocks 62 and 68 of FIG. 3, and as described in more detail in FIGS. 7A and 7B.

Figure 7A:
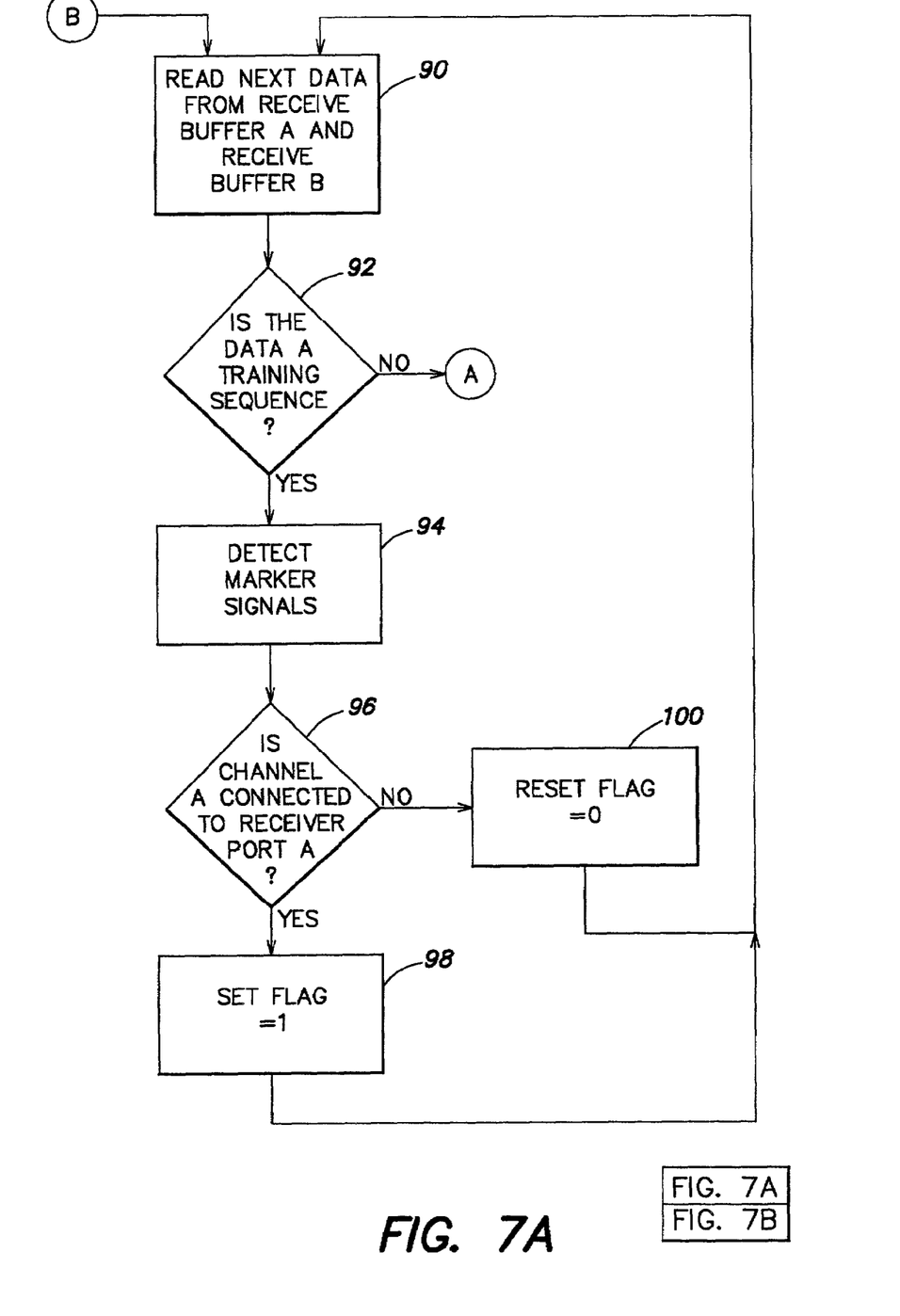
FIGS. 7A and 7B are a flow chart that illustrates an exemplary operation of the receiver circuit of FIG. 6 in accordance with the invention.
Figure 7B:
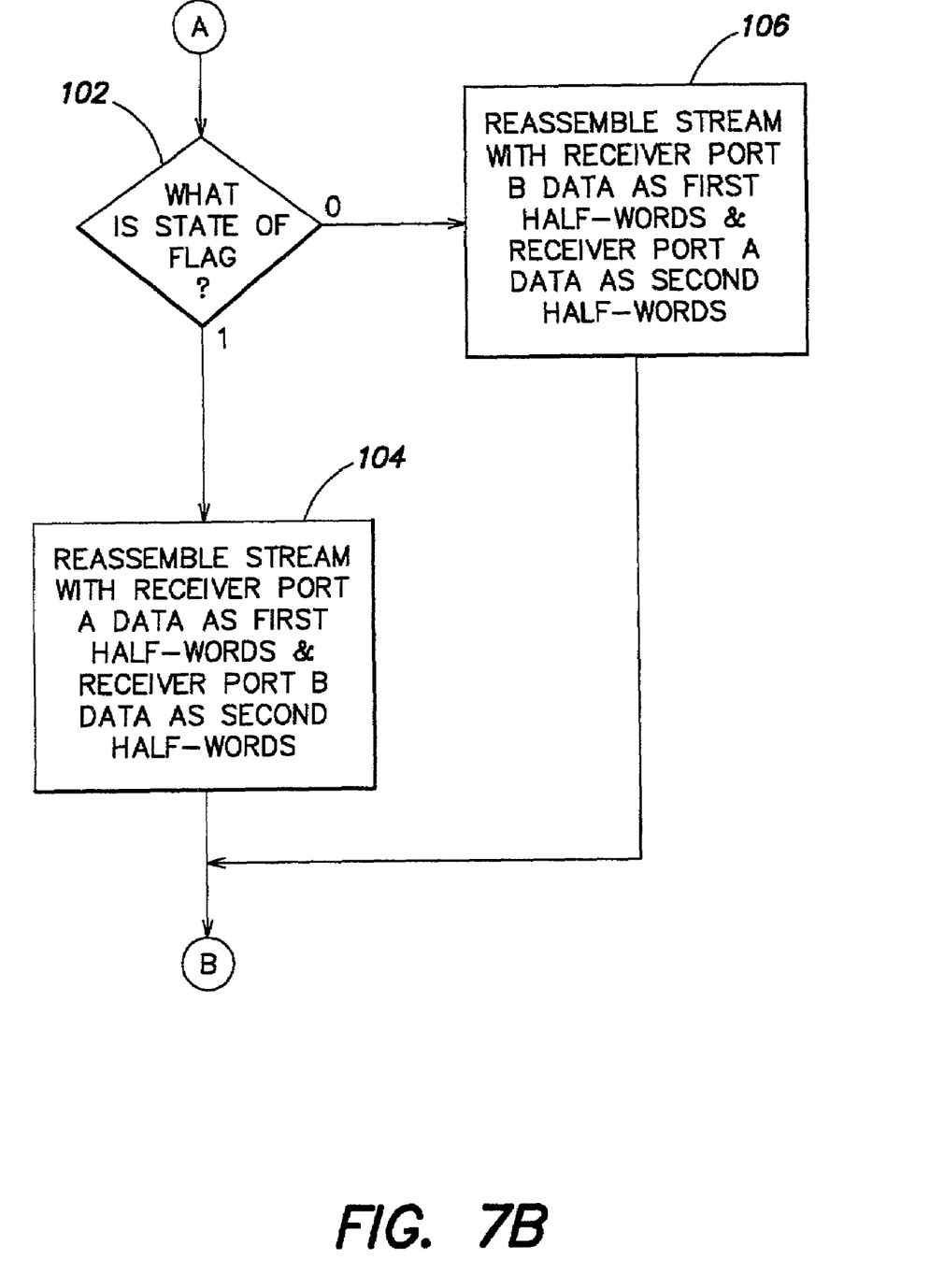

FIGS. 7A and 7B together form a flow chart that illustrates an embodiment of the functions of blocks 62 and 68 of FIG. 3. Referring to FIG. 7A, initially is a block 90. At block 90, the processing circuit 88 reads from the receive and buffer circuit A (reference numeral 84) and from the receive and buffer circuit B (reference numeral 86) the next respective data increments (e.g., portions of the substreams) stored in those circuits. Then, at: decision block 92, the processing circuit 88 determines whether the data read from the receive and buffer circuits A and B constitutes a training sequence (e.g., by examining the data). If so, then the marker signals in the training sequence are detected (block 94). More particularly, the above-described "comma-sync even" and "comma-sync odd" characters are read. Following block 94 is a decision block 96.

In decision block 96 the processing circuit 88 determines, based on the detected "comma-sync odd" and "comma-sync even" signals, whether the data channel (data channel A) corresponding to the fiber A (reference numeral 28) and the transmitter port A (reference numeral 18) is connected to the receiver port A (reference numeral 24). For example, by knowing that transmitter port A transmits comma-sync even signals during a training sequence, the processing circuit 88 may determine that transmitter port A is transmitting to receiver port A if receiver port A receives comma-sync even signals as part of a training sequence. The same would hold true if comma-sync odd signals were transmitted by the transmitter port A. (It will be appreciated that decision block 96 could equally well be phrased in terms of determining whether the data channel corresponding to the fiber B (reference numeral 30) and the transmitter port B (reference numeral 20) is connected to the receiver port B (reference numeral 26).)

If a positive determination is made at block 96, then a flag is set to the value "1" (block 98); if a negative determination is made at decision block 96, then the flag is reset, i.e., forced to the value "0" (block 100).

Following either block 98 or block 100, as the case may be, the procedure of FIG. 7A returns to block 90 and the next data increment is read; alternatively, the training sequence may be processed in a manner similar to the processing of data streams as described below with reference to blocks 102-106.

Considering again decision block 92, if a negative determination is made at that decision block (i.e., if the data read at block 90 was not a training sequence), then decision block 102 (FIG. 7B) follows decision block 92. At decision 102 the state of the flag referred to in connection with blocks 98 and 100 is determined. Based on this determination, the processing circuit 88 of the receiver circuit 22 reassembles the data stream in accordance with a marker signal detected in the last training sequence received by the receiver circuit 22. In other words, assuming first half-words of the data stream are transmitted via transmitter port A, if the flag is determined to have a value equal to "1", then block 104 follows decision block 102, and the processing circuit 88 reassembles the data stream with the data received via the receiver port A (reference numeral 24) as the first half-words, and with the data received via the receiver port B (reference numeral 26) as the second half-words. Likewise, if the state of the flag is determined to be equal to "0", then block 106 follows and the processing circuit 88 reassembles the data stream with the data received via the receiver port B (reference numeral 26) as the first half-words and the data received via the receiver port A (reference numeral 24) as the second half-words. In contrast, if second half-words of the data stream are transmitted via transmitter port A, then if the flag is determined to have a value equal to "1", the processing circuit 88 would reassemble the data stream with the data received via the receiver port A as the second half-words and with the data received via the receiver port B as the first half-words.

Following block 104 or block 106, as the case may be, the process of FIGS. 7A and 7B returns to block 90, and the next data increment is read.

The processes of FIGS. 3 and 7A–7B may be implemented in hardware, software or a combination thereof. In at least one embodiment of the invention, the processes of FIGS. 3 and 7A–7B are implemented in hardware employing a conventional PLD as referred to above. Programming of a PLD to perform the functions of FIGS. 3 and 7A–7B is well within the abilities of those of ordinary skill in the art. In a software embodiment of the invention, the processes of FIGS. 3 and 7A–B may comprise one or more computer program products. Each inventive computer program product may be carried by a medium readable by a computer (e.g., a carrier wave signal, a floppy disk, a hard drive, a random access memory, etc.).

By inserting marker signals into substreams of a data stream at a transmitter (to mark the substreams), and by detecting the marker signals at a receiver (to identify the substreams), the receiver is able to configure itself to properly reassemble the data stream from the substreams, regardless of which data channel (e.g., optical fiber) is coupled to which receiver port of the receiver.

The foregoing description discloses only exemplary embodiments of the invention; modifications of the above disclosed apparatus and methods which fall within the scope of the invention will be readily apparent to those of ordinary skill in the art.

For example, the exemplary embodiments disclosed herein contemplate dividing a data stream into two substreams. However, it is also contemplated to provide three or more data channels between a transmitter and a receiver and to divide a data stream into three or more substreams, of which at least n minus one (where n is the number of substreams) are marked with appropriate marker signals.

Furthermore, in the exemplary embodiments disclosed above, "comma-sync even" and "comma-sync odd" characters are employed as marker signals. Use of other types of marker signals is also contemplated.

Still further, the present invention has been disclosed in the context of substreams derived either from first half-words or second half-words from a data stream. It is, however, contemplated to employ the invention in substreams that are derived in other ways from a data stream.

In the exemplary embodiments disclosed herein the substreams are transmitted in respective data channels that include optical fibers. However, it is also contemplated to apply the present invention in data links that employ metal conductors, such as wires, metal traces, or coaxial cables, to transmit data signals in electrical form, or to employ other communications media (e.g., radio frequency transmission).

In the above-described embodiments, each substream is transmitted in serial form, but it is also contemplated to employ the present invention where each substream is transmitted in a parallel format.

In the above-described embodiments, the substreams are encoded for transmission according to the 8 b/10 b code. Other transmission formats are contemplated.

Accordingly, while the present invention has been disclosed in connection with exemplary embodiments thereof, it should be understood that other embodiments may fall within the spirit and scope of the invention, as defined by the following claims.

The invention claimed is:

1. A method of transmitting a stream of data, comprising:
   (a) dividing the stream of data into a first substream and a second substream;
   (b) transmitting the first substream in a first data channel;
   (c) transmitting the second substream in a second data channel; and
   (d) periodically interspersing one or more training sequences into the first substream, wherein the one or more training sequences comprise a first marker signal and wherein the one or more training sequences are interspersed in the first substream at an interval corresponding to a frequency of the stream of data.

2. The method of claim 1, further comprising receiving the first substream and detecting the first marker signal in at least one of the one or more training sequences to identify the first substream.

3. The method of claim 2, further comprising reassembling the stream of data from the first and second substreams on the basis of the detected first marker signal.

4. The method of claim 2, further comprising:
   periodically interspersing one or more additional training sequences into the second substream, wherein the one or more additional training sequences comprise a second marker signal and wherein the one or more additional training sequences are interspersed in the second substream at an interval corresponding to a frequency of the stream of data.

5. The method of claim 4, further comprising receiving the second substream and detecting the second marker signal in at least one of the one or more additional training sequences to identify the second substream.

6. The method of claim 1, further comprising:
   periodically interspersing one or more additional training sequences into the second substream, wherein the one or more additional training sequences comprise a second marker signal and wherein the one or more additional training sequences are interspersed in the second substream at an interval corresponding to the frequency of the stream of data.

7. The method of claim 6, wherein the first and second marker signals are respective comma-sync characters.

8. The method of claim 1, wherein the first marker signal is selected from the group consisting of comma-sync even characters and comma-sync odd characters.

9. The method of claim 1, wherein the first substream includes first half-words of each word of the stream of data and the second substream includes second half-words of each word of the stream of data.

10. The method of claim 1, wherein the stream of data is encoded in accordance with an $8b/10b$ code.

11. A method of transmitting a stream of data, comprising:
    dividing the stream of data into a plurality of substreams;
    transmitting the substreams in respective data channels; and
    periodically interspersing one or more training sequences into at least n minus one of the substreams, wherein n equals the number of substreams, wherein the one or more training sequences comprise a marker signal and wherein the one or more training sequences are interspersed in at least n minus one of the substreams at an interval corresponding to the frequency of the stream of data.

12. The method of claim 11, further comprising receiving the transmitted substreams and detecting the marker signal in at least n minus one of the received substreams to identify at least n minus one of the received substreams.

13. The method of claim 12, further comprising reassembling the stream of data from the received substreams on the basis of the detected marker signals.

14. A data communication apparatus, comprising:
    a transmitter;
    a receiver;
    a first data channel connecting the receiver to the transmitter; and
    a second data channel connecting the receiver to the transmitter;
    wherein the transmitter operates to:
      divide a stream of data into a first substream and a second substream;
      periodically intersperse one or more training sequences in the first substream, wherein the one or more training sequences comprise a first marker signal and wherein the one or more training sequences are interspersed in the first substream at an interval corresponding to a frequency of the stream of data;
      transmit the first substream to the receiver via the first data channel, the transmitted first substream including the inserted one or more training sequences; and
      transmit the second substream to the receiver via the second data channel.

15. The data communication apparatus of claim 14, wherein the transmitter further operates to periodically intersperse one or more additional training sequences into the second substream, wherein the one or more additional training sequences comprise a second marker signal and wherein the one or more additional training sequences are interspersed in the second substream at an interval corresponding to a frequency of the stream of data.

16. The data communication apparatus of claim 15, wherein the receiver operates to detect the first and second marker signals in the first and second substreams to identify the first and second substreams.

17. The data communication apparatus of claim 14, wherein the receiver operates to detect the first marker signal in the first substream to identify the first substream.

18. The data communication apparatus of claim 17, wherein the receiver operates to reassemble the stream of data from the first and second data streams on the basis of the detected first marker signal.

19. A data communication apparatus, comprising:
    a transmitter;
    a receiver; and
    a plurality of data channels connecting the receiver to the transmitter;
    wherein the transmitter operates to:
      divide a stream of data into a plurality of substreams;
      periodically intersperse one or more training sequences into at least n minus one of the substreams, wherein n equals the number of substreams, wherein the one or more training sequences comprise a marker signal and wherein the one or more training sequences are interspersed in at least n minus one of the substreams at an interval corresponding to the frequency of the stream of data; and
      transmit each of the substreams in a respective one of the data channels.

20. The data communication apparatus of claim 19, wherein the receiver operates to receive the transmitted substreams and to detect a marker signal in at least n minus one of the received substreams.

21. The data communication apparatus of claim 20, wherein the receiver further operates to reassemble the stream of data from the received substreams on the basis of the detected marker signals.

22. The data communication apparatus of claim 19, wherein each of the plurality of data channels includes a respective optical fiber.

23. A method of transmitting a stream of data, comprising:
   dividing the stream of data into a plurality of substreams, a first of the substreams including first half-words of each word of the stream of data and a second of the substreams including second half-words of each word of the stream of data;
   transmitting the substreams in respective fiber optic data channels;
   periodically interspersing one or more training sequences into at least n minus one of the substreams, wherein n equals the number of substreams, wherein the one or more training sequences comprise a marker signal and wherein the one or more training sequences are interspersed in at least n minus one of the substreams at an interval corresponding to the frequency of the stream of data;
   receiving the transmitted substreams and detecting athe marker signal in the one or more training sequences in at least n minus one off the received substreams to identify at least n minus one of the received substreams; and
   reassembling the stream of data from the received substreams on the basis of the detected marker signals.

24. A data communication apparatus, comprising:
   a transmitter;
   a receiver; and
   a plurality of fiber optic data channels connecting the receiver to the transmitter;
   wherein the transmitter operates to:
      divide a stream of data into a plurality of substreams, a first of the substreams including first half-words of each word of the stream off data and a second of the substreams including second half-words of each word of the stream of data;
      periodically intersperse one or more training sequences into at least n minus one of the substreams, wherein n equals the number of substreams, wherein the one or more training sequences comprise a marker signal and wherein the one or more training sequences are interspersed in at least a minus one of the substreams at an interval corresponding to the frequency of the stream of data; and
      transmit each of the substreams in a respective one of the data channels; and
   wherein the receiver operates to:
      receive the transmitted substreams and to detect the marker signal in the one or more training sequences in at least n minus one of the received substreams; and
      reassemble the stream of data from the received substreams on the basis of the detected marker signals.

* * * * *